Patented Apr. 14, 1942

2,279,405

UNITED STATES PATENT OFFICE 2,279,405

BEDDING FOR POULTRY AND ANIMALS

Carl D. Laughlin, Drexel Hill, Pa., assignor to Attapulgus Clay Company, Philadelphia, Pa., a corporation of Delaware No Drawing. Application November 29, 1939, Serial No. 306,771

2 Claims. (Cl. 119—1)

The present invention relates to an improved bedding material for poultry and animals, and to a method of preparing the bedding material.

Heretofore, various materials have been used as bedding for poultry and animals, including principally wood shavings, straw, peat moss, and sawdust. These materials have certain disadvantages, which not only impair them for their primary use, but which detract from the fertilizing use to which they are put after they have become associated with the poultry or animal excrement. Thus, wood shavings are of comparatively low absorbency and when used as a bedding, as for poultry, they do not absorb well the liquid, semi-solid, and solid components which may constitute the guano. As a result, much of the fertilizer is disassociated or loose, rather than being incorporated throughout and retained in the bedding. Aside from this fact, wood chips or shavings tend to induce an acid character in the soil, so that when this material containing the valuable guano is employed as a fertilizer, considerable lime must be used therewith in order to correct or neutralize the objectionable acid condition which would otherwise be imparted to the soil. The use of straw is accompanied by the disadvantage that this material, too, is lacking in much absorbency and is comparatively expensive. Moreover, even when distributed uniformly to begin with, it tends to become displaced under the activity of poultry or animals, on account of its long strands and their entangled condition. Peat moss is characterized by high absorbency, but it presents the drawback of comparatively dark color and dustiness. This latter fault is a serious one, especially in the case of a poultry bedding, for it has been established that many of the ailments of poultry, such as infectious bronchitis and generally impaired nasal conditions, are attributable to the inhalation of dust by the poultry. Again, dark coloring matter is leached out from the moss when it becomes wet, and tends to stain eggs, and to discolor poultry or the hides of cattle. Sawdust is not only not dry, but, like wood shavings, is objectionable as a fertilizer constituent.

In accordance with the present invention, I produce a bedding material for poultry and animals comprising granular fuller's earth ranging in particle size from about 15 to 60 mesh, and preferably from 15 to 30 mesh. Such bedding material may be produced by subjecting raw fuller's earth to heating at temperatures of from about 250° F. to about 350° F., whereby the moisture content (volatile matter) of the earth is reduced, for example, to about 15% by weight. The dried earth may then be ground and screened to the desired mesh, care being taken to reduce the dust content to a minimum. The dried earth of desired mesh size may thereafter be subjected to further heating at elevated temperatures up to about 1200° F., and preferably within the range of from about 800° F. to about 1100° F., whereby the moisture content (volatile matter) may be reduced to about 3.5% to 4.5% by weight. However, the second heating step may be dispensed with, if desired, and the fuller's earth resulting from the first heating step may be employed directly as bedding material.

It has been found advantageous to incorporate in the fuller's earth, carbonaceous material, which upon heating at elevated temperatures, for example, from about 800° F. to about 1200° F., decomposes to form carbon intimately associated with the earth. For example, fuller's earth, preferably dried to a moisture content of from about 3.5% to about 15%, may be admixed with hydrocarbon oil in amounts sufficient to wet the earth to the desired extent, and the earth containing the oil may be heated to a temperature sufficiently elevated to decompose the oil and deposit carbon in the pores and upon the surfaces of the earth particles. Such heating step may be carried out in the presence or absence of air or other gas.

As a result of the heating step or steps above described, there is imparted to the fuller's earth a substantial resistance to attrition or mechanical break-down, as well as a greatly increased capacity for absorption of liquids. Additionally, the earth is rendered sterile, thereby eliminating insects, fungi, bacteria, and the like, which may be associated with the earth in its natural state.

The bedding produced in accordance with my invention is characterized by its chemical inertness, its high moisture absorption efficiency, and its relatively low cost. Comparative tests of fuller's earth bedding with sawdust and wood shavings, two materials commonly used heretofore, have demonstrated the many advantages of the fuller's earth, including longer life of the bedding, greatly reduced decomposition odor, and elimination of bed bugs and similar parasites. The fuller's earth employed in the tests was 15–30 mesh, substantially dust-free, and sterilized by heating at about 300° F.

In tests conducted with rats and mice in solid bottom, almost completely enclosed cages, using as bedding material equal volumes of fuller's earth, sawdust, and wood shavings, respectively, the following conditions were observed.

Bedding composed of sawdust, and wood shavings, became damp and gave off a strong ammoniacal odor within 3 to 4 days. The fuller's earth bedding, however, appeared dry and gave off absolutely no odor for a period of over 2 weeks. Furthermore, due to the dryness and lack of odor of the fuller's earth bedding, flies and other insects were not attracted and the danger of infection was minimized. It was also noticed that the animals bedded in the fuller's earth appeared cleaner and did not have the yellowish tinge or discoloration common to those bedded in the sawdust or wood shavings.

Where fuller's earth is employed in large quantities for the bedding of animals, or reptiles, or birds, such as in biological laboratories, animal and poultry farms, and zoos, the used earth may be periodically collected and subjected to a process of revivification, whereby the absorptive efficiency is restored to an extent sufficient to permit the reuse of the earth for bedding purposes. For example, the used earth may be screened or sifted for the removal of solid excrement and/or unconsumed food, and the earth thus freed of foreign solids may then be subjected to heating, preferably in the presence of air, to temperatures of from about 250° F. to about 1200° F. to volatilize absorbed moisture, and to decompose and/or drive off absorbed excrement. If desired, the used earth may be washed with water prior to the heating step above described in order to extract from the earth soluble components of the absorbed excrement which may subsequently be concentrated and employed as fertilizer or for other purposes.

From what has been set forth above, it will be apparent that sterile, granular fuller's earth provides a very satisfactory bedding material for poultry, birds and animals, particularly in view of the longer life of such bedding, the maintenance of dry, odor-free cages, the minimized possibility of infection, the freedom from bed bugs and other parasites, the generally cleaner and healthier appearance of the animals, and the relatively low cost of the bedding material.

What I claim is:

1. A method of bedding poultry and animals which comprises providing a bed of granular fuller's earth which has been sterilized by heating at temperatures between 250° F. and 1200° F., utilizing such earth bedding for poultry or animals until the absorptive capacity of the earth is substantially exhausted, and thereafter restoring the absorptive capacity of said earth bedding by heating.

2. A method of bedding poultry and animals which comprises providing a bed of granular fuller's earth which has been sterilized by heating at temperatures between 250° F. and 1200° F., and utilizing such earth bedding for poultry or animals.

CARL D. LAUGHLIN.